United States Patent [19]
Jahn

[11] 3,990,280
[45] Nov. 9, 1976

[54] ANTI-THEFT DEVICE FOR AUTOMOBILES
[76] Inventor: Harry B. Jahn, 4418 S. Spaulding, Chicago, Ill. 60632
[22] Filed: Apr. 9, 1975
[21] Appl. No.: 566,369

[52] U.S. Cl. .............................. 70/238; 70/203; 70/247
[51] Int. Cl.² ........................................ B60R 25/00
[58] Field of Search ............... 70/237, 238, 57, 18, 70/202, 203, 233, 247, 15; 24/116 R, 73 A, 68 CT; 292/264

[56] References Cited
UNITED STATES PATENTS

| | | | |
|---|---|---|---|
| 2,848,777 | 8/1958 | Huber | 24/68 CT |
| 3,229,952 | 1/1966 | Zumbo | 24/68 CT |
| 3,245,239 | 4/1966 | Zaidener | 70/237 |
| 3,550,409 | 12/1970 | Pariser | 70/203 |
| 3,690,131 | 9/1972 | Davis | 70/203 |
| 3,722,239 | 3/1973 | Mestre | 248/27 |
| 3,748,876 | 7/1973 | Mathews | 70/18 |
| 3,815,391 | 6/1974 | Latta | 70/209 |

FOREIGN PATENTS OR APPLICATIONS

| | | | |
|---|---|---|---|
| 521,195 | 1/1956 | Canada | 70/237 |

Primary Examiner—Robert A. Hafer
Attorney, Agent, or Firm—John S. O'Brien

[57] ABSTRACT

An anti-theft device for automobiles equipped with a foot brake pedal and a brake lever secured thereto, and with a gear shift lever mounted on the steering column, includes an elongated rod having a first return bend therein adjacent one end and forming a hook which is adapted to be hooked to the brake lever and retained by the foot brake pedal, and a second return bend therein adjacent the remaining end, a chain having a plurality of links and being adapted to extend between the remaining end of the rod and the gear shift lever, means including the second return bend for connecting the rod to a link adjacent to one end of the chain, and means for connecting a link adjacent the remaining end of the chain to the gear shift lever, one of the connecting means including a padlock serving to lock the device to the foot brake pedal and the gear shift lever when installed to prevent operation of either of them.

4 Claims, 6 Drawing Figures

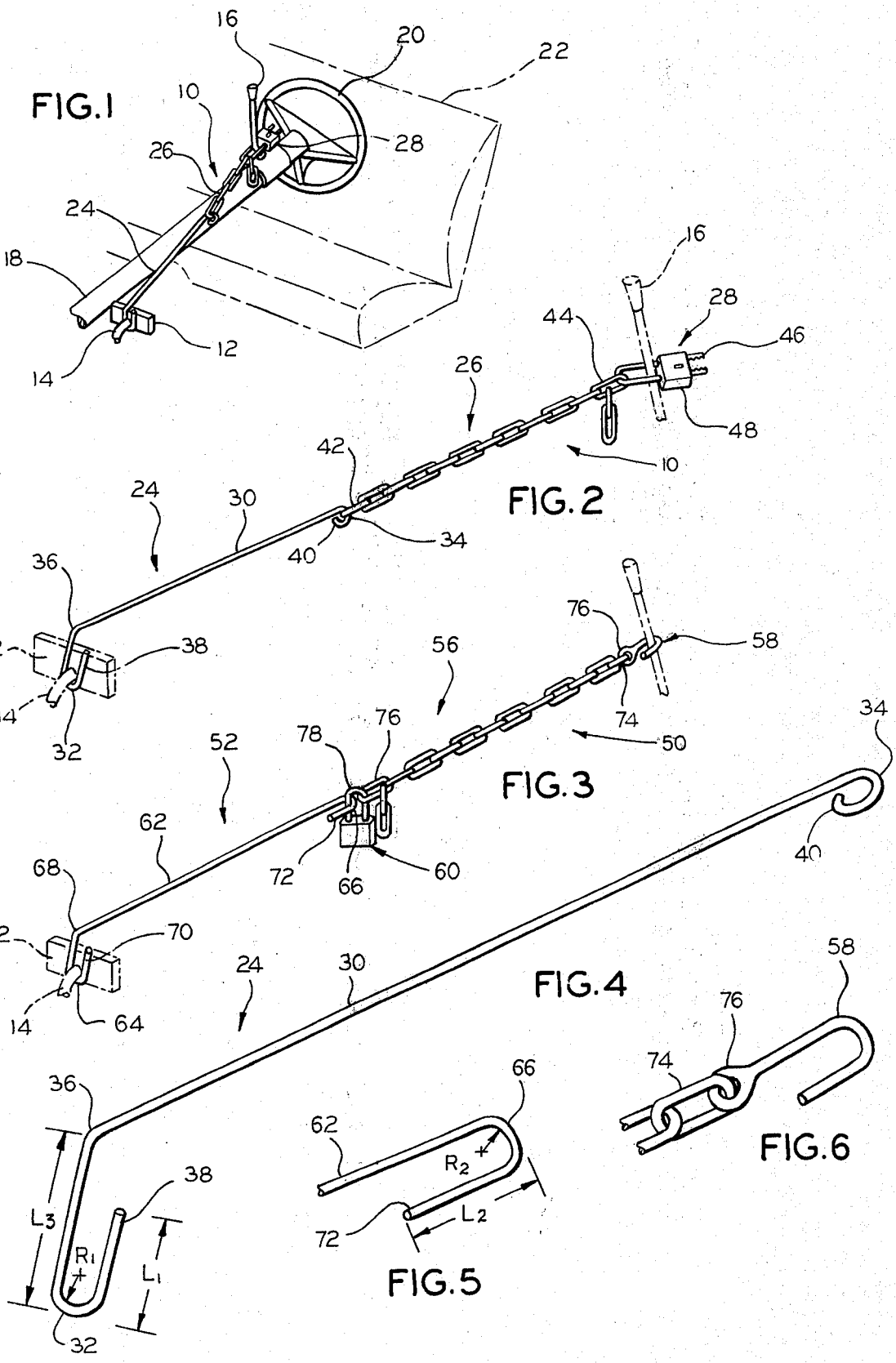

ANTI-THEFT DEVICE FOR AUTOMOBILES

BACKGROUND OF THE INVENTION

This invention relates to anti-theft devices for automobiles, more particularly, to a device which is locked to the foot brake pedal and the gear shift lever of an automobile to prevent operation of either of them.

Various anti-theft devices for automobiles have been provided in the past. Such devices have suffered from a number of shortcomings, including having relatively elaborate construction, being excessively bulky, and/or being relatively expensive. Also, the devices frequently are not universally adapted for use with a large variety of automobile makes and models.

A current anti-theft device is constructed of two bar members adjustably secured together by a lock. Each bar member is provided with a hook at one end, and the hooks are at opposite ends of the device. One hook is hooked to the brake lever secured to the foot brake pedal, and the other hook is hooked to a spoke of the steering wheel. The device has the disadvantage that it might be defeated by sawing through the wheel spoke. The device is not adapted for connection to the gear shift lever, which is constructed of hard steel.

Previously, I have employed a link chain which extended between the foot brake pedal and the gear shift lever and was padlocked to each of them. This device was inconvenient to attach for locking purposes and to remove. It was also relatively bulky, less attractive than desired, and required two padlocks.

SUMMARY OF THE INVENTION

The invention provides an anti-theft device for automobiles equipped with a foot brake pedal and a brake lever secured thereto, and with a gear shift lever mounted on the steering column, which device includes an elongated rod having a first return bend therein adjacent one end and forming a hook which is adapted to be hooked to the brake lever and retained by the foot brake pedal, and a second return bend therein adjacent the remaining end, a chain having a plurality of links and being adapted to extend between the remaining end of the rod and the gear shift lever, means including the second return bend for connecting the rod to a link adjacent one end of the chain, and means for connecting a link adjacent the remaining end of the chain to the gear shift lever, one of said connecting means including a padlock serving to lock the device to the foot pedal and the gear shift lever when installed to prevent operation of either of them. The members of the device preferably are constructed of hardened steel.

The new anti-theft device serves to lock the gear shift lever associated with an automatic transmission in the "park" position, so that the transmission is locked and the automobile cannot be driven even though the motor may be started. At the same time, the foot brake is rendered inoperative. The structure is such that the device cannot be defeated in the time and with the equipment generally available to a car thief.

The new device is universally applicable to a large variety of makes and models of the major American automobiles. It is easily, rapidly and reliably attached in operative position when it is desired to secure an automobile against theft, and readily removed following its use.

The device is compact and therefore readily accommodated, taking up relatively little space in use and when stowed between uses. It requires no alteration of the automobile structure and does not mar the structure. It is low cost in relation to the degree of protection provided.

BRIEF DESCRIPTION OF THE DRAWINGS

The attached drawings illustrate preferred embodiments of the invention, without limitation thereto. In the drawings, like elements are identified by like reference symbols in each of the views, and:

FIG. 1 is a perspective view of one embodiment of the anti-theft device of the invention, illustrating the device as it is installed and locked to the foot brake pedal and the gear shift lever of an automobile to prevent operation of either of them;

FIG. 2 is an enlarged perspective view of the device, illustrating the device as it is assembled in use;

FIG. 3 is a similarly enlarged perspective view of a second embodiment of the device, illustrating the device as it is assembled in use;

FIG. 4 is a further enlarged perspective view of the rod member of the device of FIGS. 1 and 2;

FIG. 5 is a similarly enlarged perspective view of one end of the rod member of the device of FIG. 3; and FIG. 6 is a similarly enlarged perspective view of one end of the chain member and of the hook thereon in the device of FIG. 3.

DESCRIPTION OF THE PREFERRED EMBODIMENTS

Referring to FIGS. 1, 2 and 4 of the drawings, an anti-theft device 10 constitutes a preferred embodiment of the invention. The device is illustrated in FIG. 1 as it appears when installed in an automobile, the interior of which is shown fragmentarily, the automobile being equipped with a foot brake pedal 12 and a brake lever or arm 14 secured thereto, and with a gear shift lever 16 for an automatic transmission mounted on the steering column 18 having a steering wheel 20. The automobile parts are conventional, and they are shown in their relation to the front seat 22 of the automobile, fragmentarily illustrated in phantom lines. The illustrative automobile parts are selected as generally representative of a number of makes and models of the major American automobiles. The disposition of the automobile parts varies among makes and models, but the invention is widely applicable thereto.

The anti-theft device 10 includes as its principle members or components an elongated rod 24, a flexible link chain 26, and a padlock 28, which is a ratchet-type lock of conventional construction. The rod 24 is hooked to the brake lever 14 and retained by the foot brake pedal 12. The rod 24 and the chain 26 are hooked or linked together. The chain 26 is connected to the gear shift lever 16 by the padlock 28, to complete the connection between the brake pedal 12 and the gear shift lever and prevent operation of either of them.

The rod 24 includes an elongated straight central section 30, a first return bend 32 adjacent one end of the rod, a second return bend 34 adjacent the remaining end of the rod, and an angle bend 36 adjacent and spaced from the first return bend 32. The first return bend 32 forms a U-shaped brake lever hook 38, which extends from the angle bend 36 at an angle to the body of the rod, represented by the central section 30. The rod end bearing the second return bend 34 is further bent to form a substantially closed, off-center connecting eye 40 at that end.

The chain includes a plurality of interconnected ring links, of which links numbered 42 and 44 and located adjacent opposite ends of the chain are connected to other components in the illustrative assembly of the device 10. One link 42 is a terminal link, and it is connected to the rod 24. Thus, the second return bend 34 in the rod is hooked to the terminal link 42, and the connecting eye 40 makes a permanent connection to the link and thus the chain 26. The link 44 adjacent to the opposite end, which in the illustration is the third link from the end, is connected to the gear shift lever 16 by the padlock 28. Thus, the padlock includes a ratchet shackle 46 which extends through the link 44 and extends around the gear shift lever 16 to connect the two members together. The position of the lock case 48 is adjusted on the shackle 46 to draw the device 10 taut when installed.

An anti-theft device 50, illustrated in FIGS. 3, 5 and 6, constitutes a second embodiment of the invention. It is modified in several respects, as compared to the above-described device 10. The second device 50 includes an elongated rod 52, a link chain 56, an anchor hook 58, and a ratchet-type padlock 60. The rod 52 is hooked to the brake lever 14 and retained by the foot brake pedal 12. The chain 56 is connected to the gear shift lever 16 by means of the anchor hook 58. The rod 52 and the chain 56 are connected together by the padlock 60.

The rod 52 includes an elongated straight central section 62, a first return bend 64 adjacent one end thereof, a second return bend 66 adjacent the remaining end thereof, and an angle bend 68 adjacent and spaced from the first return bend 64. The first return bend 64 forms a brake lever hook 70, the structure and angular disposition of which are like the lever hook 38 of the rod 24 in FIGS. 1, 2 and 4. The second return bend 66 forms a similar connecting hook 72.

The anchor hook 58 on the chain 56 is secured to a terminal link 74 thereof by a hook eye 76 interconnected with the link. The anchor hook 58 is adapted to be hooked to the gear shift lever 16. In the illustration, another chain link 76, which is the third link from the opposite end of the chain, is connected to the second return bend 66 by the padlock 60, the shackle 78 of which extends through the link 76 and engages the return bend 66.

All vulnerable parts of the devices 10 and 50 are constructed of steel hardened or tempered to withstand the types of assault to be expected from a car thief with the equipment which might be carried and within the time available for accomplishing the theft. Thus, the rods 24 and 52, the chains 26 and 56, the padlocks 28 and 60, particularly the shackles 46 and 78 thereof, and the anchor hook 58 preferably are constructed of steel hardened to a Rockwell "C" hardness of at least about 55. Such hardness may be achieved, for example, by case-hardening. The components of the devices then resist the saw blades and bolt cutters likely to be used in an attempted theft. The gear shift lever 16 and the brake pedal 12 and attached brake lever 14 likewise are hardened members that will resist such types of assault.

The devices 10 and 50 differ in the location in which the padlock is placed. In the first device 10, the lock 28 is secured to the gear shift lever 16, so that the device 10 may be drawn taut. In the second device 50, the lock 60 is employed to link the rod 52 to the chain link 76 or another link which will tighten the device 50, with a possible small amount of slack remaining in the device. Such slack ordinarily is not enough to permit operation of the automobile. The second device 50 may be preferable, e.g., in instances where it is inconvenient to place the padlock around the gear shift lever 16.

The first device 10 is provided with the connecting eye 40 for the purpose of retaining the chain 26 on the rod 24 when not in use. The connecting hook 72 of the second device 50 may be replaced by the eye 40, if desired, but there is no particular advantage in doing so in the second device. Alternatively, the connecting eye 40 in the first device 10 may be replaced by the connecting hook 72 of the second device 50, to enable the chain 26 to be removed from the rod 24.

While the invention is not limited to particular dimensions, certain dimensions are deemed preferable. Thus, it is preferred to construct the rods 30 and 52 from steel rod stock of about 5/16 inch diameter. Likewise, it is preferred that the links of the chains 26 and 56 have the same ring thickness, and that the lock shackles 46 and 78 have similar rod thicknesses. The elements of the anchor hook 58 also preferably have such ring thickness.

Referring to FIGS. 4 and 5, each of the radii $R_1$ and $R_2$ of the respective return bends 32 and 66 preferably is about 1 inch. It is preferred that each hook length $L_1$ and $L_2$ be about 2 inches long. The dimension $L_3$, the distance from the return bend 32 to the angle bend 36, preferably is about 3 inches. These dimensions provide a certain flexibility in accommodating various makes and models of automobiles, while insuring that the device may not be removed once attached and locked. The overall length of the rods 24 and 52 preferably is about 14 inches, and the length of the chains 26 and 56 preferably is about 12 inches.

In attaching the first device 10 to an automobile, the user may grasp the central section 30 of the rod 24 and engage the lever hook 38 with the brake lever 14 from beneath the lever. The angle bend 36 and the central section 30 overlie the foot pedal 12. The chain 26 is pulled up to the gear shift lever 16, and the padlock 28 is engaged with the chain link 44 and the gear shift lever 16. The lock case 48 is tightened on the shackle 46 until the device 10 is taut. At this time, the lever hook 38 is drawn up against the foot pedal 12, and the gear shift lever 16 is in its "park" position, being held or biased in that position. The gear shift lever 16 cannot be moved from its "park" position, and the brake pedal 12 cannot be operated. The lever hook 38 cannot be removed from the brake lever 14, due to the tautness of the device 10 and also because the brake pedal 12 prevents the central rod section 30 from being moved downwardly far enough to free the hook from the lever. The tautness of the device 10 also prevents the padlock 28 from being slid off of the gear shift lever 16. Consequently, the automobile cannot be operated, even if successfully broken into and started, and despite the fact that the thief may have a key for the automobile.

The second device 50 is installed by connecting the lever hook 70 on the rod 52 to the brake lever 14, in the same manner as with the first device 10, and hooking the anchor hook 58 on the chain 56 to the gear shift lever 16. The padlock 60 then is employed to connect the connecting hook 72 on the rod 52 to the appropriate chain link 76, which serves to draw the device 50 as tight as possible. With this device, also, the gear shift lever 16 is held in its "park" position, and the brake pedal 12 cannot be operated. The tautness of the device prevents removal of the lever hook 70 from the brake lever 14 or removal of the anchor hook 58 from the gear shift lever 16.

The invention thus provides an anti-theft device that is reliable, convenient, compact and economical. The device is universally applicable to a large number of automobile makes and models, and it requires no modification or alteration of the automobile structure. In particular, the device is adapted to be wrapped around a steering column to interconnect a foot brake pedal and a gear shift lever which are not interconnectable along a straight line. The device also is adapted for compact storage when not in use. While certain preferred embodiments of the invention have been described and illustrated, it will be apparent to those skilled in the art that various changes and modifications may be made therein within the spirit and scope of the invention. It is intended that all such changes and modifications be included within the scope of the appended claims.

I claim:

1. In combination with mechanism for operating an automobile, said mechanism including a foot brake pedal having a brake lever secured thereto, and a gear shift lever mounted on a steering column, an anti-theft device comprising:
   an elongated rod having a first return bend therein adjacent one end and forming a U-shaped hook which is hooked to the brake lever and retained by the foot brake pedal, a substantially closed connecting eye therein adjacent the remaining end, and an angle bend therein adjacent the hook, whereby the hook extends at an angle to the body of the rod,
   a flexible chain having a plurality of interconnected ring links and extending between said remaining end of the rod and the gear shift lever,
   said connecting eye being permanently connected to the terminal link at one end of said chain, and
   a padlock having a shackle connecting a selected link adjacent the remaining end of said chain to the gear shift lever,
   said padlock serving to lock the device to the foot brake pedal and the gear shift lever to prevent operation of either of them,
   each of said rod, chain, and shackle members being constructed of hardened steel,
   said device thereby being adapted to be wrapped around a steering column to interconnect a foot brake pedal and a gear shift lever which are not interconnectable along a straight line and also being adapted for compact storage when not in use.

2. A combination as defined in claim 1 and wherein said hook is about 2 inches long.

3. A combination as defined in claim 1 and wherein said padlock is a ratchet-type lock adapted for drawing the device taut when installed.

4. A combination as defined in claim 3 and wherein said rod, chain, and shackle members are hardened to a Rockwell "C" hardness of at least about 55.

* * * * *